US006264334B1

(12) United States Patent
Kushida

(10) Patent No.: US 6,264,334 B1
(45) Date of Patent: Jul. 24, 2001

(54) ROAD-CURVE MIRROR WITH RADIO WAVE REFLECTION PLATE

(75) Inventor: Kazumitsu Kushida, Saitama (JP)

(73) Assignee: Honda Giken Kogyo Kabushiki Kaisha

( * ) Notice: Subject to any disclaimer, the term of this patent is extended or adjusted under 35 U.S.C. 154(b) by 0 days.

(21) Appl. No.: 09/315,123

(22) Filed: May 20, 1999

(30) Foreign Application Priority Data

Jun. 4, 1998 (JP) ..... 10-155559
Jun. 5, 1998 (JP) ..... 10-156985

(51) Int. Cl.[7] ..... G02B 5/12
(52) U.S. Cl. ..... 359/515; 359/547; 359/552
(58) Field of Search ..... 359/515, 527, 359/551, 552, 871, 869, 534, 547; 340/901, 902, 904, 425.5, 463; 116/35

(56) References Cited

U.S. PATENT DOCUMENTS 5,530,588 6/1996 Vivier .

FOREIGN PATENT DOCUMENTS

| | | |
|---|---|---|
| 0136956 A2 | 4/1985 | (EP) . |
| 0348671 A1 | 1/1990 | (EP) . |
| 0962908 A2 | 12/1999 | (EP) . |
| 2216600 | 8/1990 | (JP) . |
| 5-20599A | 1/1993 | (JP) . |
| 7-225900A | 8/1995 | (JP) . |
| 7244800 | 9/1995 | (JP) . |

*Primary Examiner*—James Phan
(74) *Attorney, Agent, or Firm*—Birch, Stewart, Kolasch & Birch, LLP

(57) ABSTRACT

A movable body detecting device and a road-curve mirror with a radio wave reflection plate for allowing a reception side movable body present at a position where the movable body is hidden from a transmission side movable body to accurately receive movable body detecting radio waves transmitted from the transmission side movable body by making use of a road-curve mirror. A radio wave reflection plate for reflecting radio waves, being transmitted from one movable body A and received by another movable body B so that the reception side movable body detects the presence of the transmission side movable body, is mounted in a road-curve mirror provided on such a road to assist an individual in navigating an intersection.

9 Claims, 6 Drawing Sheets

ROAD-CURVE MIRROR WITH RADIO WAVE REFLECTION PLATE

BACKGROUND OF THE INVENTION

1. Field of the Invention

The present invention relates to a road-curve mirror used and a movable body detecting system adapted for transmitting/receiving radio waves between a vehicle and a movable body such as a vehicle or a pedestrian, so that the reception side detects the presence of the transmission side.

2. Description of Background Art

Conventionally, there have been proposed various methods which allow an operated vehicle to detect another movable body such as a vehicle in the neighborhood thereof.

For example, Japanese Patent Laid-open No. Hei2216600 discloses a method, in which a vehicle with an on-board receiver detects the presence of another movable body by receiving, via the on-board receiver, alarm radio waves continuously transmitted from a transmitter mounted on the movable body.

Japanese Patent Laid-open No. Hei7-244800 discloses a method in which an on-board receiver having the basic configuration similar to that of the on-board receiver described as above is improved to decide whether or not the received alarm radio waves are necessary by referring to the operational state of the vehicle and to indicate information based on the necessary alarm radio waves.

When a reception side vehicle is located at a position where the vehicle is hidden from a sight of a transmission side vehicle by an obstacle such as a building, the above alarm radio waves fail to reach the reception side vehicle. In addition, even if the alarm radio waves reaches the reception side vehicle, the strength of the electric field thereof becomes weak to such a degree that the reception side vehicle cannot accurately detect the presence of the transmission side vehicle.

On a road where the visibility of a driver in one vehicle against another vehicle is poor by an obstacle which blocks the presence of another vehicle, a road-curve mirror is generally provided in order that the driver in the vehicle can visually perceive the presence of another vehicle hidden therefrom by the reflection of an image of another vehicle from the mirror. In this case, however, unless the vehicle comes close to the road-curve mirror to some extent, the driver in the vehicle cannot visually detect the presence of another vehicle, or the driver in the vehicle may fail to have a look of the road-curve mirror.

SUMMARY AND OBJECTS OF THE INVENTION

An object of the present invention is to provide a road-curve mirror with a radio wave reflection plate which allows a reception side movable body present at a position where the movable body is hidden from a transmission side movable body to accurately receive movable body detecting radio waves transmitted from the transmission side movable body by making use of a road-curve mirror.

To achieve the above object, according to an embodiment of the present invention, there is provided a road-curve mirror with a radio wave reflection plate for reflecting radio waves wherein the radio waves are transmitted from one movable body and received by another movable body so that the reception side movable body detects the presence of the transmission side movable body. The radio wave reflection plate is mounted in a road-curve mirror provided on such a road that the visibility of a driver in each of the movable bodies against the other is poor.

Since the radio wave reflection plate is provided in the road-curve mirror, movable body detecting radio waves transmitted from a transmission side movable body are reflected from the radio wave reflection plate, reaching a reception side movable body at a difficult to receive position hidden by an obstacle such a building with the electric field strength thereof sufficiently maintained, and are received by the reception side movable body. As a result, the reception side movable body located at the position hidden from the transmission side movable body can accurately detect the presence of the transmission side movable body on the basis of the reception of the movable body detecting radio waves in combination with the detection of an image of the transmission side movable body reflected from the road-curve mirror.

Since the radio wave reflection plate is provided in the road-curve mirror, it does not become an obstacle, that is, it is located at the optimum position.

The radio wave reflection plate is formed by a small-sized, lightweight metal plate or film capable of efficiently reflecting radio waves, and can be compactly disposed in the road-curve mirror. Accordingly, the radio wave reflection plate can be manufactured at a low cost.

According to an embodiment of the present invention, in addition to the configuration of the road-curve mirror with a radio wave reflection plate, the radio wave reflection plate is disposed in a housing provided at the back of a mirror surface portion of the road-curve mirror, and the mirror surface portion of the road-curve mirror is made from a light reflection material allowing transmission of radio waves therethrough.

Since the mirror surface portion of the road-curve mirror is made from a light reflection material which allows transmission of radio waves therethrough and the radio wave reflection plate is disposed at the back of the mirror surface portion of the road-curve mirror, light is reflected from the mirror surface portion, but radio waves pass through the mirror surface portion and are reflected from the radio wave reflection plate to be changed in their traveling direction. As a result, the radio waves thus reflected from the radio wave reflection plate can reach to a reception side movable body at a position hidden from the transmission side movable body with the electric field strength sufficiently maintained, and are accurately received by the reception side movable body.

Since the radio wave reflection plate is disposed in the housing at the back of the mirror surface portion of the road-curve mirror, it can be protected from a natural environmental change such as wind and rain.

This makes it easy to maintain the performance of the radio wave reflection plate. According to an embodiment of the present invention, in addition to the configuration of the road-curve mirror with a radio wave reflection plate, the radio wave reflection plate is supported on a pole for supporting the road-curve mirror in parallel to the road-curve mirror. Since the radio wave reflection plate is supported on the pole of the road-curve mirror, it can be mounted with ease and can additionally be additionally be mounted on the existing road-curve mirror.

According to an embodiment of the present invention, in addition to the configuration of the road-curve mirror with a radio wave reflection plate described in previous embodiments, the reflection plane of the radio wave reflection plate is a concave plane. Since the radio waves reflected from the concave plane of the radio wave reflection plate are collected and are received in an increased electric field strength, it is possible to suppress the transmission output.

According to an embodiment of the present invention, in addition to the configuration of the road-curve mirror with a radio wave reflection plate described in previous embodiments, the reflection plane of the radio wave reflection plate is a convex plane. Since the radio waves reflected from the convex plane of the radio wave reflection plate are extended, it is possible to enlarge the reception range. Such a road-curve mirror with a radio wave reflection plate is therefore suitably used for a wide road having a number of lanes.

Another object of the present invention is to provide a movable body detecting device which allows a reception side movable body present at a position where the movable body is hidden from a transmission side movable body to accurately receive movable body detecting radio waves transmitted from the transmission side movable body.

To achieve the above object, there is provided a movable body detecting device wherein a radio wave relay for relaying the movable body detecting radio waves, are transmitted from one movable body and received by another movable body, so that the reception side movable body detects the presence of the transmission side movable body. The radio wave relay is mounted in a structure provided on such a road wherein the visibility of a driver in each of the movable bodies against the other is poor.

Since the radio wave relay is provided in a structure provided on such a road wherein the visibility of a driver in each of two movable bodies against the other is poor, movable body detecting radio waves transmitted from a transmission side movable body are relayed by the radio wave relay for retransmitting the radio waves to a reception side movable body located at a difficult-to-receive position hidden by an obstacle such as a building, and are accurately received by the reception side movable body. As a result, the reception side movable body located at the position hidden from the transmission side movable body can accurately detect the presence of the transmission side movable body on the basis of the reception of the movable body detecting radio waves.

The construction is exemplified by a road-curve mirror, traffic signal, or a pole such as a telephone pole. In particular, if the radio wave relay is provided in a road-curve mirror, it does not become an obstacle, that is, it is located at the optimum position.

According to an embodiment of the invention, the radio wave relay amplifies and retransmits the movable body detecting radio waves in a specific direction from which the relay receives the movable body detecting radio waves.

With this configuration, even if movable body detecting radio waves transmitted from a transmission side movable body propagate a long-distance to the radio wave relay and thereby the electric field strength thereof is reduced, the radio waves are amplified and retransmitted by the radio wave relay, with a result that the retransmitted radio waves are accurately received by a reception side movable body, even if the reception side movable body is relatively far from the radio wave relay so that the movable body cannot recognize the presence of the transmission side movable body on the basis of an image thereof reflected from a road-curve mirror.

According to the present invention, the radio wave relay adds, to the radio waves to be re-transmitted, a signal indicating that the radio waves have been re-transmitted by the relay.

With this configuration, a driver in a reception side movable body can identify whether the received radio wave is the radio wave transmitted directly or by way of the radio wave relay. If receiving the radio waves by way of the relay only, the driver recognizes that the transmission side movable body exists at a position out of the visibility of the driver over an obstacle such as a building; and if receiving the movable body detecting radio waves transmitted directly, the driver recognizes that it is highly possible that the transmission side movable body exists at a position within the visibility of the driver.

According to an embodiment of the present invention, the structure is a road-curve mirror, the radio wave relay is disposed in a housing at the back of a mirror surface portion of the road-curve mirror, and the mirror surface portion of the road-curve mirror is made from a light reflection material allowing transmission of radio waves therethrough.

Since the mirror surface portion of the road-curve mirror is made from a light reflection material and the radio wave relay is disposed at the back of the mirror surface portion of the road-curve mirror, light is reflected from the mirror surface portion, but radio waves pass through the mirror surface portion, being relayed by the radio wave relay, and re-transmitted to be changed in their traveling direction. As a result, the radio waves thus retransmitted from the radio wave relay reach a reception side movable body at a position hidden from the transmission side movable body, and are accurately received by the reception side movable body.

Since the radio wave relay is disposed in the housing at the back of the mirror surface portion of the road-curve mirror, it can be protected from an environmental change in nature such as wind and rain. This makes it easy to maintain the performance of the radio wave relay.

According to an embodiment of the present invention, the structure is a road-curve mirror, and the radio wave relay is supported on a pole for supporting the road-curve mirror in parallel to the road-curve mirror.

Since the radio wave relay is supported on the pole of the road-curve mirror, it can be simply, additionally mounted on the existing road-curve mirror. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
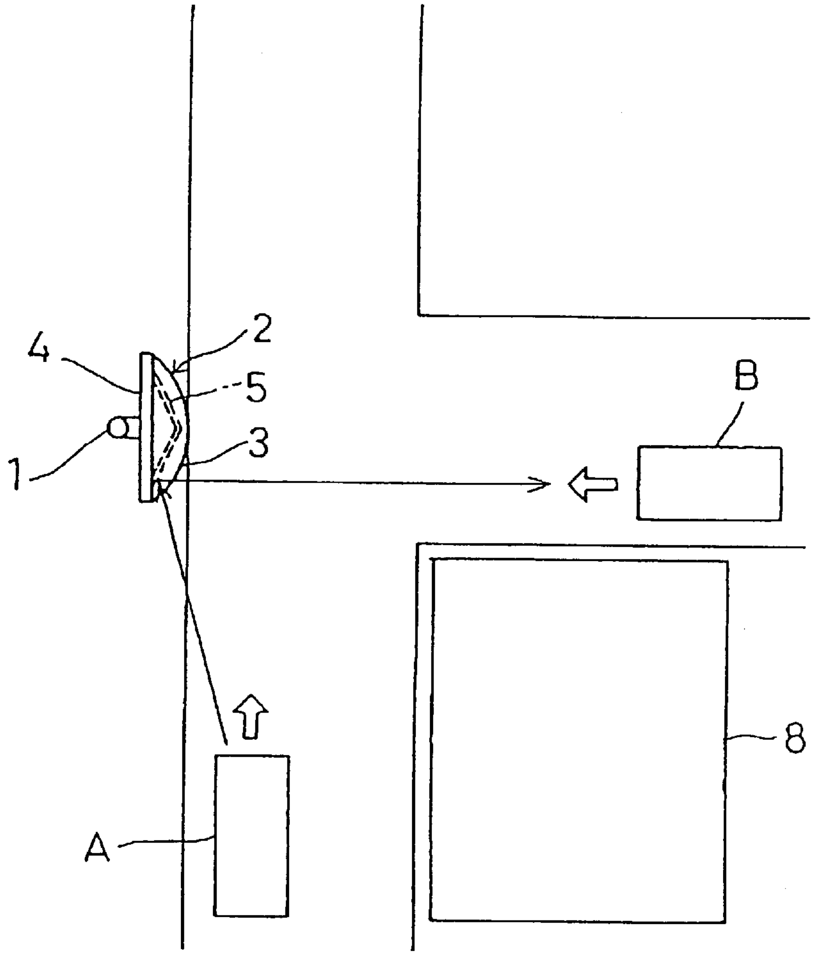
FIG. 1 is a view showing one example in which a road-curve mirror with a radio wave reflection plate according to one embodiment of the present invention is applied to a T-intersection.

FIG. 1 shows a T-intersection, where a first road has a branch road extending at right angles from the first road. A pole 1 is placed at a side edge of the first road and facing to the branch road. A road-curve mirror 2 is mounted on the pole 1.

Figure 2:
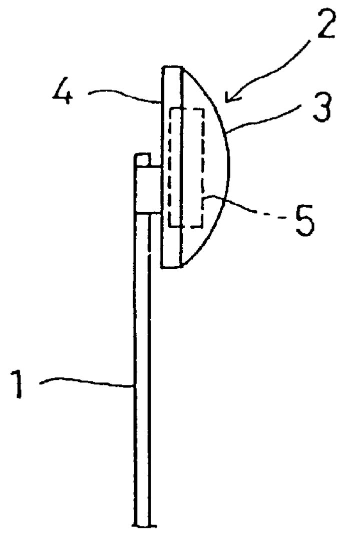
FIG. 2 is a side view of the road-curve mirror with a radio wave reflection plate shown in FIG. 1.

Referring to FIGS. 1 and 2, the road-curve mirror 2 is composed of a convex mirror surface portion 3, a back plate 4, a housing having a cavity provided therebetween, and a radio wave reflection plate 5 contained in the housing.

The convex mirror surface portion 3 is made from a material which allows transmission of radio waves therethrough, and the radio wave reflection plate 5 is formed by a flat metal plate capable of efficiently reflecting radio waves. The radio wave reflection plate 5 is bent into a V-shape in the plan view with halves of the V-shaped plate 5 each directed obliquely forwardly.

It should be noted that the radio wave reflection plate 5 is not necessarily formed by a metal plate but may be formed by any material insofar as it is capable of efficiently reflecting radio waves.

Now, it is assumed that as shown in FIG. 1, vehicles A and B are moving towards the T-intersection. At this time, a driver in each of the vehicles A and B cannot directly see the other vehicle because the visibility of the driver against the other vehicle is obstructed by a building 8 at the corner of the T-intersection.

Movable body detecting radio waves transmitted from a transmitter mounted on the vehicle A propagate with their directivity being substantially stronger in the forward direction, and therefore, the radio waves do not directly reach the vehicle B because they are obstructed by the building 8.

The movable body detecting radio waves, however, pass through the convex mirror surface portion 3 of the road-curve mirror 2, being reflected from the radio wave reflection plate 5 to propagate along the branch road toward the vehicle B and are accurately received by a receiver mounted on the vehicle B with the electric field strength thereof sufficiently maintained.

A control unit of the vehicle B is operated to turn on an indicator lamp for indicating the presence of the vehicle A or to display the position or symbols indicating the presence of the vehicle A on a navigation screen on the basis of the reception of the movable body detecting radio waves, to thereby inform the driver of the presence of the vehicle A.

Accordingly, the driver in the vehicle B can recognize, on the basis of the information thus obtained, the fact that the vehicle A is present at a position hidden by the building 8 located along the First road.

The driver in the vehicle B can look at an image of the vehicle A reflected from the road-curve mirror 2, however, it may be difficult for the driver in the vehicle B when being away from the road-curve mirror 2 to visually recognize the vehicle A by the reflected image, or the driver may fail to recognize the vehicle A in the road-curve mirror 2. Even in such cases, the driver in the vehicle B can accurately receive the movable body detecting radio waves transmitted from the vehicle A to thus recognize the presence of the vehicle A.

The radio wave reflection plate 5 is provided at the optimum position, that is, it is contained in the road-curve mirror 2. If the radio wave reflection plate 5 is provided at a location other than the road-curve mirror 2, there occurs an inconvenience wherein the plate 5 may become an obstacle. According to the present invention, it is possible to avoid such an inconvenience wherein the plate 5 becomes an obstacle.

The radio wave reflection plate 5 is formed by a small-sized, lightweight flat metal plate capable of efficiently reflecting radio waves and can be compactly embedded in the housing of the road-curve mirror 2. Such a plate 5 can be manufactured at a low cost.

Since the radio wave reflection plate 5 is disposed in the housing at the back of the mirror surface portion of the road-curve mirror 2, it can be protected from a natural environmental change such as wind and rain. As a result, it is easy to maintain the performance of the radio wave reflection plate 5.

When the vehicle B transmits movable body detecting radio waves, the vehicle A can receive the radio waves reflected from the radio wave reflection plate 5 and sense the presence of the vehicle B. In this way, the driver in each of the vehicles A and B can recognize the other vehicle via the radio waves reflected from the radio wave reflection plate 5.

Figure 3:
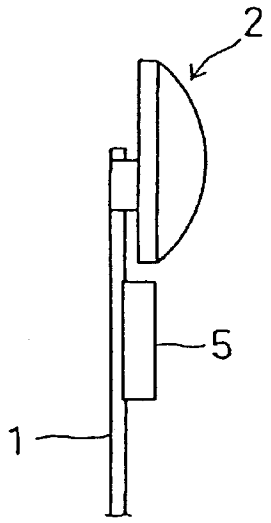
FIG. 3 is a side view of a road-curve mirror with a radio wave reflection plate according to another embodiment.

In the above embodiment, the radio wave reflection plate 5 is disposed in the housing of the road-curve mirror 2. However, as shown in FIG. 3, it may be mounted on the pole 1 at a position lower than tat of the road-curve mirror 2 in such a manner as to be parallel thereto.

With this configuration, since the radio wave reflection plate 5 is mounted separately from the road-curve mirror 2, it is easy for the plate 5 to be additionally mounted on the existing road-curve mirror 2.

Two variations of the radio wave reflection plate will be described below with reference to FIGS. 4 and 5.

Figure 4:
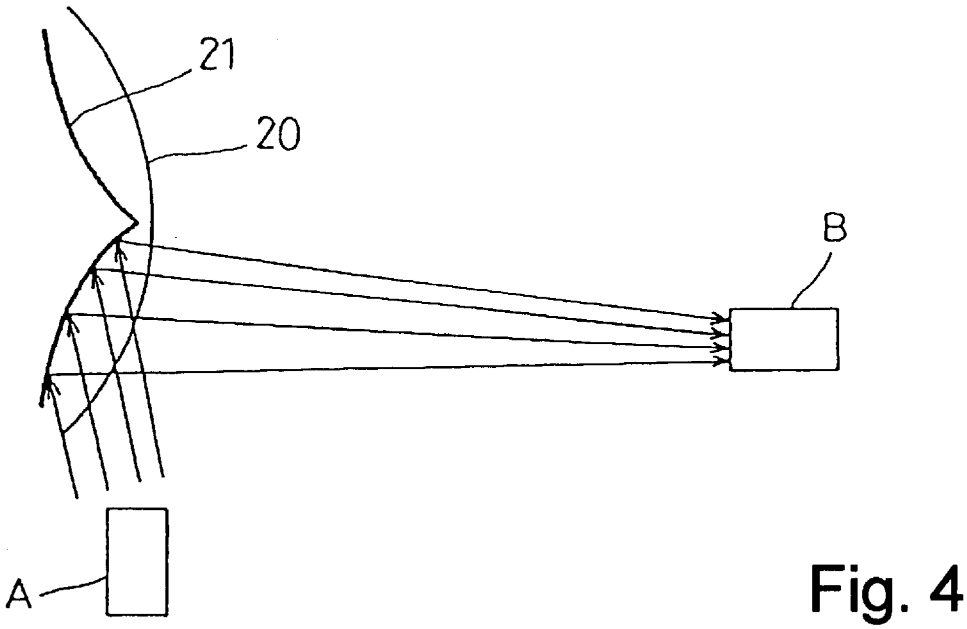
FIG. 4 is a schematic top view of a road-curve mirror with a radio wave reflection plate according to a further embodiment.

The variation shown in FIG. 4 is configured such that the reflection plane of a radio wave reflection plate 21 that is provided at the back of a convex mirror surface portion 20 of a road-curve mirror is curved into a concave plane.

With this configuration, since movable body detecting radio waves reflected from the concave plane of the radio wave reflection plate 21 are collected and received with an increased electric field strength it is possible to suppress the transmission output.

Such a variation is suitably used for a narrow road such as a single lane road.

Figure 5:
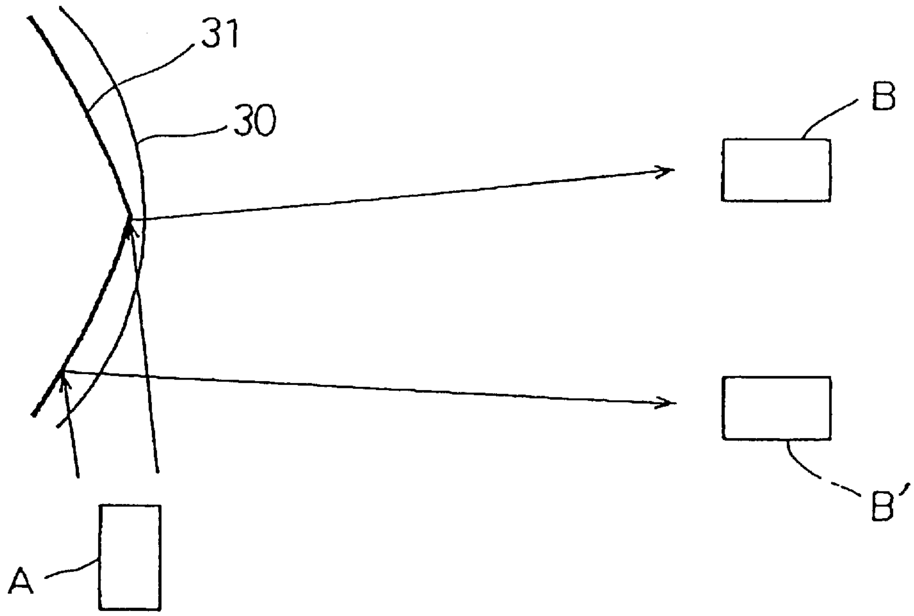
FIG. 5 is a schematic top view of a road-curve mirror with a radio wave reflection plate according to still a further embodiment.

The variation shown in FIG. 5 is configured such that the reflection plane of a radio wave reflection plate 31 that is provided at the back of a convex mirror surface portion 30 of a road-curve mirror is curved into a convex plane.

With this configuration, since the movable body detecting radio waves reflected from the convex plane of the radio wave reflection plate 31 are extended, it is possible to enlarge the reception range.

Such a variation is suitably used for a wide road having a number of lanes.

Figure 6:
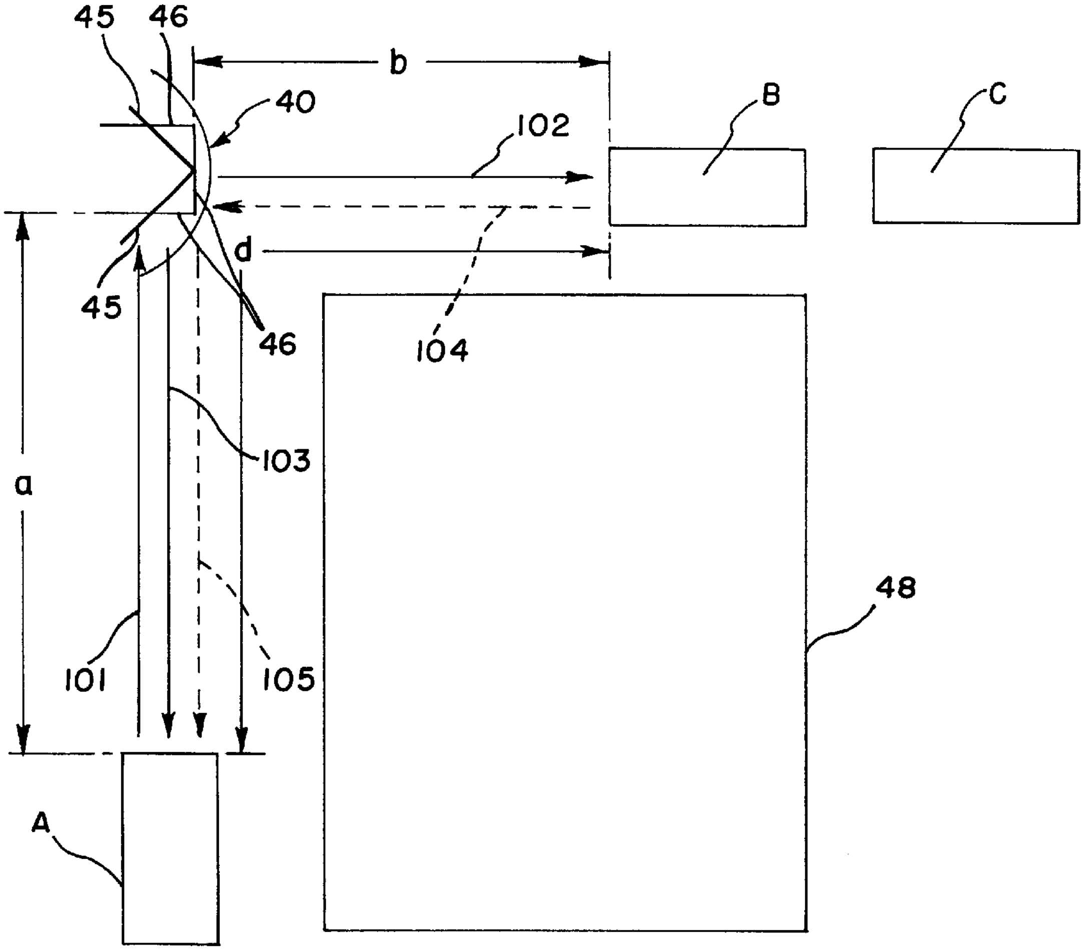
FIG. 6 is a view showing an example in which a road-curve mirror with a radio wave reflection plate according to an additional embodiment is applied to a T-intersection.

A further embodiment of the present invention will be described with reference to FIG. 6. A road-curve mirror 40 is also provided at an intersection of a T-intersection. A radio wave reflection plate 45, which is bent into a V-shape in the plan view like the above-described radio wave reflection plate 5, is disposed in a housing at the back of a convex mirror surface portion of the road-curve mirror 40. In this embodiment, a radio wave reflection plate 46 is bent into a U-shape in the plan view and is also disposed in the housing.

When vehicles A and B each mounting a transmitter/receiver operate on the T-intersection along a building 48 toward the intersection, a driver in each of the vehicles A and B cannot directly visually recognize the other vehicle because the visibility of the driver against the other vehicle is blocked by the building 48.

The vehicle A transmits forwardly movable body detecting radio waves 101 to which an identification signal of the vehicle A is added.

The movable body detecting radio waves 101 are reflected from the radio wave reflection plate 45 bent into the V-shape to be propagated as movable body detecting radio waves 102 toward the vehicle B running in the direction substantially perpendicular to the running direction of the vehicle A. The movable body detecting radio waves 102 are received by the vehicle B.

Accordingly, the driver in the vehicle B can recognize the presence of the vehicle A by receiving the movable body detecting radio waves 102, and if the driver can visually recognize the vehicle A noticing an image of the vehicle A reflected from the road-curve mirror 40, he/she can clearly understand that the vehicle A is present at a location hidden by the building 48.

On the other hand, the movable body detecting radio waves 101 are also reflected from the radio wave reflection plate 46 bent into the U-shape and returned to the vehicle A as distance measuring radio waves 103.

The vehicle A is able to measure a distance “a” from the vehicle A to the road-curve mirror 40 on the basis of a time elapsed until reception of the distance measuring radio waves 103 after transmission of the movable body detecting radio waves 101.

When receiving the movable body detecting radio waves 102, the vehicle B transmits response signal radio waves 104 composed of the received movable body detecting signal to which an identification signal of the vehicle B is added. The response signal radio waves 104 are reflected from the radio wave reflection plate 45 bent into the V-shape to be propagated as distance measuring radio waves 105 toward the vehicle A which runs in the direction substantially perpendicular to the running direction of the vehicle B and are received by the vehicle A.

The vehicle A is able to measure a distance “d” from the vehicle A to the vehicle B by way of the road-curve mirror 40 by measuring a time elapsed after transmission of the movable body detecting radio waves 101 until reception of the distance measuring radio waves 105.

Accordingly, a distance “b” from the road-curve mirror 40 to the vehicle B can be calculated by subtracting the distance “a” from the distance “d”.

In this way, the vehicle A is able to obtain approximately accurate distance information on the road-curve mirror 40 and vehicle B by transmitting the movable body detecting radio waves 101.

If another vehicle C operates along the same road in addition to the vehicle B. since an identification signal of the vehicle C is added to the response signal radio waves 104 transmitted from the vehicle C, when the response signal radio waves 104 are reflected from the radio wave reflection plate 45 and are received by the vehicle A as the distance measuring radio waves 105, the vehicle A is able to identify that the radio waves are transmitted from the vehicle C.

The vehicle A is thus allowed to recognize the presence of the vehicles B and C, and to measure the distance between each of the vehicles B and C and the road-curve mirror 40.

The vehicle A can keep up with not only the two vehicles B and C but also a plurality of vehicles.

Figure 7:
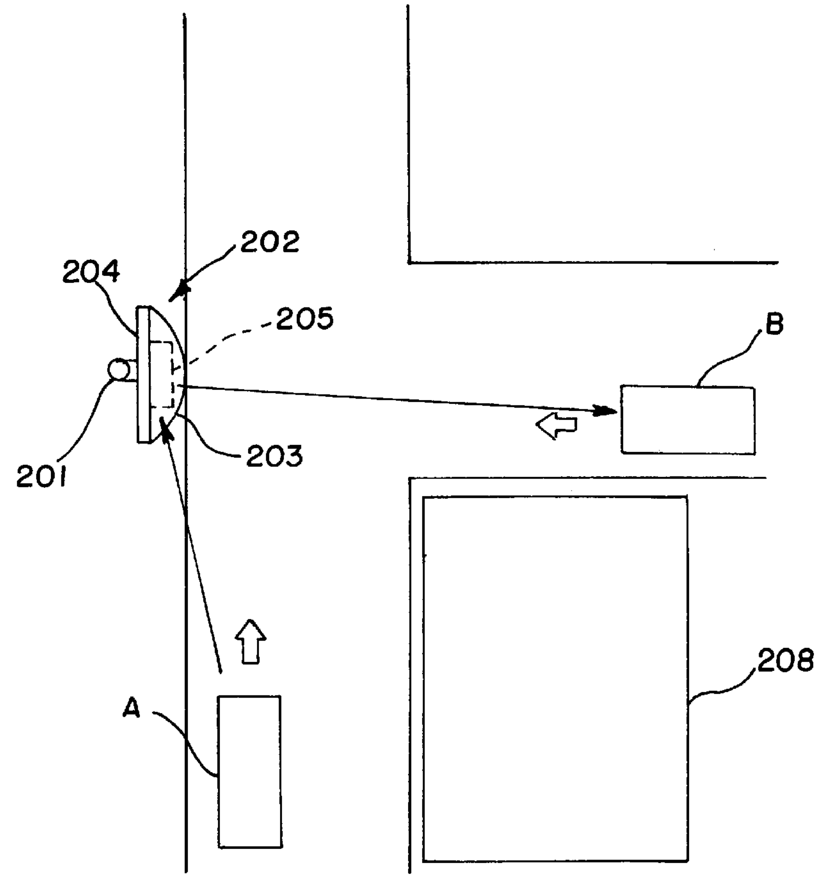
FIG. 7 illustrates another example in which a road-curve mirror with a radio wave relay according to a second embodiment of the present invention is applied to a T-intersection.

FIG. 7 illustrates a T-intersection, where a first road has a branch road extending at right angles from the first road. A pole 201 is placed at a side edge of the first road, facing to the branch road. A pole 201 is erected at a side edge, facing to the branch road, of the first road, and a road-curve mirror 202 is mounted on the pole 201.

Figure 8:
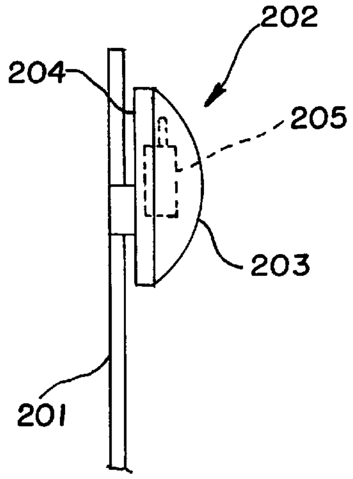
FIG. 8 is a side view of the road-curve mirror with a radio wave relay shown in FIG. 7.

Referring to FIGS. 7 and 8, the road-curve mirror 202 is composed of a convex mirror surface portion 203, a back plate 204, a housing having a cavity provided therebetween, and a radio wave relay 205 contained in the housing.

The convex mirror surface portion 203 is made from a material which allows transmission of radio waves therethrough, and the radio wave relay 205 is adapted to amplify and retransmits movable body detecting radio waves in a specific direction from which the relay 205 receives the movable body detecting radio waves.

The radio wave relay 205 contained in the road-curve mirror 202 provided on the T-intersection receives movable body detecting radio waves transmitted from the first road and retransmits them to the branch road, and receives movable body detecting radio waves transmitted from the branch road and retransmits them to right and left portions of the first road.

Now, it is assumed that as shown in FIG. 7, vehicles A and B move towards the T-intersection. At this time, a driver in each of the vehicles A and B cannot directly look at the other vehicle because the visibility of the driver against the other vehicle is obstructed by a building 208 at the comer of the T-intersection.

Movable body detecting radio waves transmitted from a transmitter mounted on the vehicle A propagate with their directivity being substantially stronger in the forward direction, and therefore, the radio waves do not directly reach the vehicle B because they are obstructed by the building 208.

The movable body detecting radio waves, however, pass through the convex mirror surface portion 203 of the road-curve mirror 202, and are received by the radio wave relay 205. The radio waves are amplified and retransmitted to the branch road by the radio wave relay 205, and are accurately received by a receiver mounted on the vehicle B with the electric field strength thereof sufficiently maintained.

A control unit of the vehicle B is operated to turn on an indicator lamp for indicating the presence of the vehicle A or to display the position or symbols indicating the presence of the vehicle A on a screen of a car navigation system on the basis of the reception of the movable body detecting radio waves, to thereby inform the driver of the presence of the vehicle A.

The driver in the vehicle B can recognize, by the information thus obtained, the fact that the vehicle A is present at a position hidden by the building 8 located along the first road.

The driver in the vehicle B can look at an image of the vehicle A reflected from the road-curve mirror 202, however, it may be difficult for the driver in the vehicle B apart from the road-curve mirror 202 to visually recognize the vehicle A from the reflected image, or the driver may fail to see road-curve mirror 202. Even in such cases, the driver in the vehicle B can accurately receive the movable body detecting radio waves transmitted from the vehicle A to thus recognize the presence of the vehicle A.

The radio wave relay 205 is provided at the optimum position, that is, it is contained in the road-curve mirror 202. If the relay 205 is provided at a location other than the road-curve mirror 202, there occurs an inconvenience that the relay 5 may become an obstacle. According to the present invention, it is possible to avoid such an inconvenience that the relay 205 may become an obstacle.

Since the radio wave relay 205 is disposed in the housing at the back of the mirror surface portion of the road-curve mirror 202, it can be protected from a natural environmental change such as wind and rain. As a result, it is easy to maintain the performance of the radio wave relay 205.

When the vehicle B transmits movable body detecting radio waves, the vehicle A can receive the radio waves relayed by the radio wave relay 205 and perceive the presence of the vehicle B. In this way, the driver in each of the vehicles A and B can recognize the other vehicle via the radio waves relayed by the radio wave relay 205.

Figure 9:
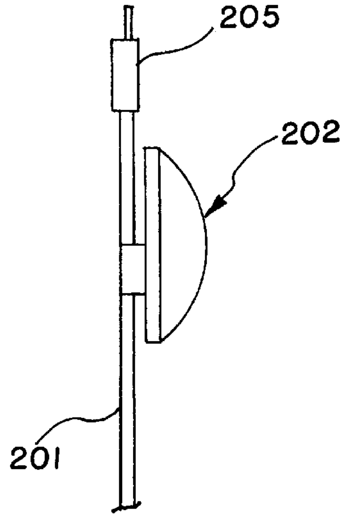
FIG. 9 is a side view of a road-curve mirror with a radio wave relay according to another embodiment.

In the above embodiment, the radio wave relay 205 is disposed in the housing of the road-curve mirror 202. However, as shown in FIG. 9, it may be mounted on the pole 1 at a position lower than that of the road-curve mirror 202 in such a manner as to be parallel thereto.

With this configuration, since the radio wave relay 205 is mounted separately from the road-curve mirror 202, it is easy for the relay 205 to be additionally mounted on the existing road-curve mirror 202.

Figure 10:
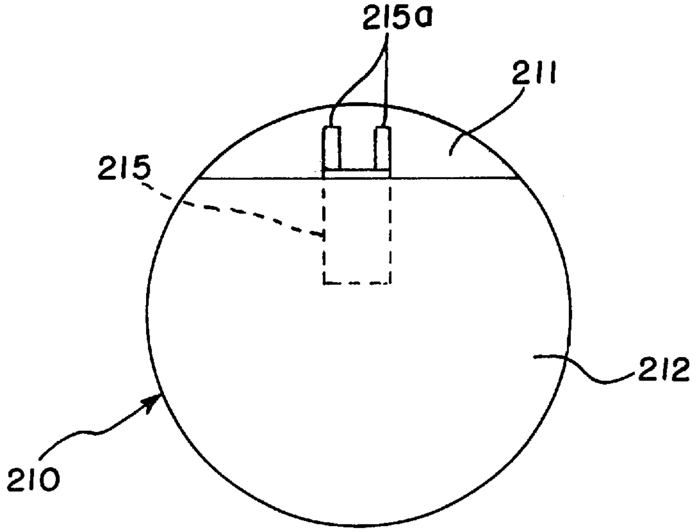
FIG. 10 is a front view of a road-curve mirror with a radio wave relay according to a further embodiment.

In an embodiment shown in FIG. 10, a radio wave relay 215 is contained in a housing of a road-curve mirror 210 having a spherical mirror surface portion. Here, the spherical mirror surface portion for covering the radio wave relay 215 is composed of a metal deposition surface portion 212 on which a metal is vapor-deposited, excluding a metal non-deposition surface portion 211 whose upper surface is not vapor-deposited with metal partially. The metal deposition surface portions 212 constitutes a reflection mirror surface portion.

The radio wave relay 215 contained in the housing has an antenna 215*a* facing to the metal non-deposition surface portion 211.

With this configuration, even if the reflection mirror surface portion of the road-curve mirror 210 is formed by the metal deposition surface portion which reflects not only light but also radio waves, the radio wave relay 215 contained in the road-curve mirror 210 is capable of relaying movable body detecting radio waves by partially providing the metal non-deposition surface portion 211 and arranging at least the antenna 215*a* of the radio wave relay 215 in such a manner as to face to the metal non-deposition surface portion 11.

In the above embodiment, the metal non-deposition surface portion 211 is provided on the upper side of the spherical mirror surface portion; however, it may be provided on the lower side in consideration of the environmental condition.

The radio wave relay 215 can add, to the retransmitted radio waves, a signal indicating that the radio waves have been re-transmitted by the relay 215. With this configuration, a reception side movable body is able to identify the case where it directly receives the movable body detecting radio waves from a transmission side movable body from the case where it indirectly receives the movable body detecting radio waves by way of the relay 215.

The above identification exhibits the following effect. If receiving movable body detecting radio waves by way of the relay only, a driver in a reception side movable body recognizes that there exists a movable body which is hidden by an obstacle such as a building and is moving towards the intersection, and if receiving movable body detecting radio waves transmitted directly as well as receiving movable body detecting radio waves by way of the relay, the driver in the reception side movable body recognizes that there exists a movable body which is not hidden by a blocking substance and is moving towards the intersection, and in this case, there is a possibility that the driver visually recognizes the movable body not hidden by the blocking substance.

Figure 11:
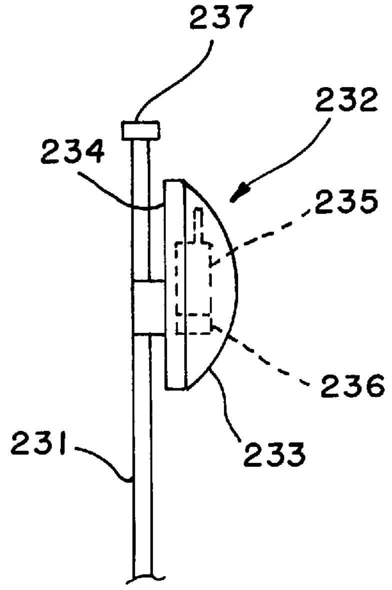
FIG. 11 is a side view of a road-curve mirror with a radio wave relay including a GPS receiver according an additional embodiment.

FIG. 11 shows a further embodiment in which a GPS (Global Positioning System) receiver as well as a radio wave relay are provided in a road-curve mirror.

A road-curve mirror 232 supported on a pole 231 has the same structure as that shown in FIG. 8, that is, it includes a convex mirror surface portion 233, a back plate 234, a housing having a cavity disposed therebetween, and a radio wave relay 235 contained in the housing.

A GPS receiver 236 is also contained in the housing, and a GPS antenna 237 is mounted at the upper end of the pole 31.

Since the accurate positional coordinate of the road-curve mirror 232 is known, the GPS receiver 236 can obtain information on a deviation between the accurate positional coordinate and a GPS positional coordinate calculated on the basis of radio waves supplied from a satellite and received by the GPS antenna 237. The GPS receiver 236 feeds the deviation information to the radio wave relay 235.

When movable body detecting radio waves transmitted from a transmission side movable body reaches the radio wave relay 235, the relay 235 adds the deviation information to the received movable body detecting radio waves and retransmits them to a reception side movable body, and the relay 235 also feeds back the deviation information to the transmission side movable body.

The reception side movable body receives the retransmitted radio waves, to thereby recognize the presence of the transmission side movable body, and if including a GPS receiver, the reception side movable body can correct a GPS positional coordinate thereof into an accurate positional coordinate on the basis of the deviation information.

The transmission side movable body also can, if including a GPS receiver, correct a GSP positional coordinate thereof into an accurate positional coordinate on the basis of the deviation information supplied from the relay 235.

If the reception side movable body transmits a response signal after adding accurate positional coordinate information thereto, the transmission side movable body having received the response signal by way of the radio wave relay 235 can obtain the accurate positional coordinate of the reception side movable body, that is, can accurately obtain a relative positional relationship among the transmission side movably body, reception side movable bodies, and road-curve mirror 232.

In this way, the radio wave relay 235 can be utilized for transmission of deviation information used for correction of the GPS positional coordinate.

In the above embodiments, the radio wave relay is provided in the road-curve mirror or on a pole thereof, that is, the relay is provided by making use of existing equipment having been already provided at a position closer to an intersection. Therefore, the relay may be of course provided on a structure, for example, a telephone pole provided at an intersection.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A road-curve mirror for assisting individuals to navigate an intersection comprising:

a road-curve mirror for mounting at a predetermined intersection; and a radio wave reflection plate for reflecting radio waves, said radio wave reflection plate being mounted in a predetermined relationship relative to said road-curve mirror;

wherein radio waves being transmitted from one movable body are reflected by said radio wave reflection plate and received by second movable body so that a reception side of the second movable body detects the presence of the first movable body.

2. The road-curve mirror for assisting individuals to navigate an intersection according to claim 1, wherein said radio wave reflection plate is disposed in a housing provided at a back of a mirror surface portion of said road-curve mirror, and said mirror surface portion of said road-curve mirror is made from a light reflection material allowing transmission of radio waves therethrough.

3. The road-curve mirror for assisting individuals to navigate an intersection according to claim 2, wherein the reflection plane of said radio wave reflection plate is a concave plane.

4. The road-curve mirror for assisting individuals to navigate an intersection according to claim 2, wherein the reflection plane of said radio wave reflection plate is a convex plane.

5. The road-curve mirror for assisting individuals to navigate an intersection according to claim 1, wherein said radio wave reflection plate is supported on a pole for supporting said road-curve mirror in parallel to said road-curve mirror.

6. The road-curve mirror for assisting individuals to navigate an intersection according to claim 5, wherein the reflection plane of said radio wave reflection plate is a concave plane.

7. The road-curve mirror for assisting individuals to navigate an intersection according to claim 5, wherein the reflection plane of said radio wave reflection plate is a convex plane.

8. The road-curve mirror for assisting individuals to navigate an intersection according to claim 1, wherein the reflection plane of said radio wave reflection plate is a concave plane.

9. The road-curve mirror for assisting individuals to navigate an intersection according to claim 1, wherein the reflection plane of said radio wave reflection plate is a convex plane.

* * * * *